Patented Dec. 15, 1953

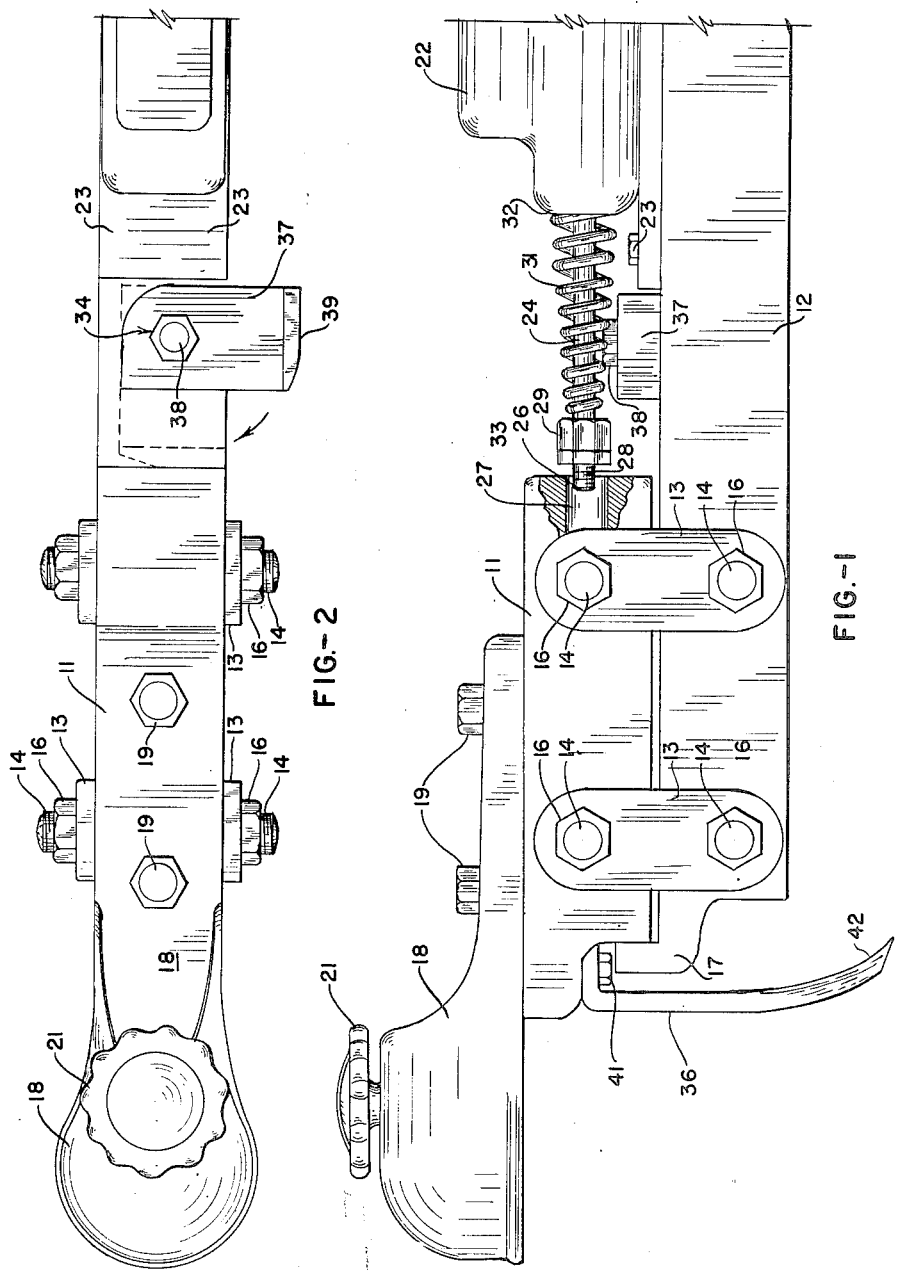

2,662,616

UNITED STATES PATENT OFFICE 2,662,616

AUTOMATICALLY ACTUATED TRAILER BRAKE

Joseph A. De Lateur, Denver, Colo.

Application October 10, 1949, Serial No. 120,537

2 Claims. (Cl. 188—112)

This invention relates to an automatically actuated hydraulic brake mechanism for trailers or similar vehicles.

While adaptable to other uses the present invention is intended to be especially useful as a brake mechanism for trailers of the type now commonly towed by passenger vehicles. Previously many different types of brake mechanisms have been devised for such specific application, and though the development has been largely directed to the design of brake mechanisms which may be actuated by hand controls, some previous work has been done in the development of automatically actuated hydraulic brakes. Recognizing such previous development, the present inventor has devised a mechanism for automatically actuating a hydraulic brake mechanism on a trailer that eliminates any need for special equipment on the towing vehicle. By eliminating the need for such special equipment, a trailer equipped with the device of this invention may be safely towed by any car or automotive vehicle having a satisfactory trailer hitch. Further, the present invention provides added safety features designed to further enhance the possibilities of widespread commercial acceptance.

In developing the present invention the inventor has been guided by the following objects:

To provide a mechanism for automatically actuating the hydraulic brake system of a trailer whenever the towing vehicle is decelerated.

To provide such a mechanism utilizing a reciprocally mounted block arranged for engagement with the actuating rod of a conventional type hydraulic master cylinder.

To provide such a mechanism utilizing a toggle link arrangement to limit the degree of motion of said block toward the master cylinder and a permanent stop member for limiting the motion of said block away from said cylinder and to transmit the normal towing forces to the trailer.

To provide a brake actuating mechanism which will be automatically operated whenever the trailer becomes detached from the towing vehicle.

To provide a trailer brake mechanism utilizing a reciprocally mounted block member that may be deactivated by a mechanical stop mechanism to prevent normal brake actuating movement of said block when the trailer is being backed into desired position.

To provide means for closely adjusting the sensitivity and degree of braking power exerted by an automatically actuated hydraulic brake mechanism.

To provide a brake mechanism for trailers which is inexpensive, simple in operation, readily serviced and simple to use, that does not require special equipment on the towing vehicle.

Further objects and advantages of the present invention will become more apparent from the appended description and drawings in which:

Fig. 1 is a side elevation in partial section showing the general arrangement of parts for this invention;

Fig. 2 is a plan view further showing the features of this invention.

Briefly stated, the present invention provides a reciprocally mounted member secured to the frame or draw bar of a trailer by means of a toggle link arrangement. A hydraulic master cylinder is likewise mounted on the draw bar of the trailer in such position that the actuating rod of the cylinder extends toward the slide member. A trailer hitch of conventional type is secured to the slide member in such manner that the towing forces exerted by the vehicle are transmitted through the hitch to the slide member thereby causing forward reciprocal movement of said slide which brings the slide into engagement with a permanent stop member integral with said draw bar. Accordingly when the slide is in its forward position the normal towing forces are exerted directly on the draw bar of the trailer. When the towing vehicle is decelerated, relative motion of the slide member and draw bar causes the slide to come into contact with the actuating rod of the master cylinder to actuate the hydraulic brakes and slow or stop the trailer. If the actuation of the trailer brakes is excessive the hydraulic pressure on the brakes is relieved when the braking action causes the slide to move toward its forward position. By proper adjustment, made possible by an actuating rod adjusting nut, the brakes on the trailer can be balanced to operate only when desirable.

The utility of this invention is further increased by the incorporation of a spur member made of spring steel and attached to the slide block in such manner that if the trailer becomes detached from the towing vehicle the spur will engage the ground to cause movement of said slide and, consequently, application of the brakes.

It has been a relatively common experience of those who pull trailers behind automobiles to find that the trailer oftentimes tries to override the automotive vehicle. This effect is generally noticed whenever the towing vehicle is decelerated or whenever the vehicle and trailer are being moved down a slope. Sometimes when the trailer tends to override the towing vehicle, the trailer assumes a sideways movement which becomes increasingly disturbing to the driver and occupants of the towing vehicle. It has long been recognized that it is possible to prevent such occurrence by the use of brakes on the trailer. Commonly such brakes as have been devised are arranged so that a hand lever in the drivers compartment may be operated to actuate the trailer brakes. Whenever such a hand operated brake is utilized some further connection must be provided between the towing vehicle and the towed trailer. Inasmuch as this type of brake equipment is expensive, few trailer owners have such equipment on their automobiles and consequently risk, danger, and discomforture are endured.

The present invention eliminates the need for such equipment by providing an automatically actuated brake mechanism, the features of which will be more readily understood in connection with the accompanying drawings. In Figs. 1 and 2 it will be noted that the applicant provides a slide block 11 suitably positioned above a frame member or tow bar 12 of a conventional type trailer. Block 11 is held in its position above tow bar 12 by means of toggle links 13 interconnected to the slide block 11 and tow bar 12 by bolts 14 passing through said members and secured externally by nuts 16. The toggle links themselves are of such length as to allow relative movement between the slide block 11 and tow bar 12. Though movement backwardly and forwardly from the position shown in Fig. 1 normally would be possible with such a toggle link arrangement, the inventor prefers to provide an extension 17 on the tow bar 12 to limit the forward movement of the slide block 11, and in the embodiment shown the extension is so placed that the toggle links 13 never move forwardly beyond the upright vertical position as shown in Fig. 1.

Though other types of trailer hitches are suitable, Fig. 1 shows a socket type hitch 18 secured to the slide block 11 by means of cap screws 19 or the like. This socket hitch 18 is of a conventional type that may be readily engaged upon a ball type trailer hitch (not shown) and secured in such position when the knob 21 is rotated to lock an internal mechanism against the aforementioned ball hitch. When the socket hitch 18 is secured to a ball type hitch on a vehicle, towing forces are transmitted through the ball, hitch, slide block, tow bar extension and tow bar to pull the trailer along the road as desired.

In order to actuate the hydraulic braking system in accordance with movement of the slide block 11, the inventor secures a hydraulic master cylinder 22 of conventional design above the tow bar 12 by use of cap screws 23 or the like. The actuating rod 24 of the hydraulic master cylinder is directed forwardly toward the slide block 11, and the end 26 of the actuating rod is received in a cylindrical opening 27 in the slide block 11. The actuating rod is provided with threads 28, and an adjusting nut 29 is threaded on the actuating rod 24 to cause slight compression of a spring 31 disposed between the forward face 32 of the master cylinder 22 and the adjusting nut 29. The adjusting nut itself is of such size that when the slide block 11 is moved rearwardly with respect to its forward position as shown in Fig. 1, the rear face 33 of the slide block 11 will come into contact with the adjusting nut 29. Further relative movement of the slide block 11 and tow bar 12 will cause the actuating rod 24 to be moved into the hydraulic master cylinder 22 compressing the fluid therein and actuating the hydraulic brakes of the trailer.

Since the positioning of the adjusting nut 29 on the actuating rod 24 is variable, the sensitivity of the trailer braking system may be varied. Movement of the nut 29 toward the block 11 will increase the degree of brake actuation while movement in the opposite direction decreases the sensitivity. In either position the length of the toggle links 13 is predesigned to allow sufficient relative motion between the slide block 11 and tow bar 12 to give maximum braking power without damage to the actuating rod of the master cylinder.

It will be apparent from the description and drawings that whenever the towing vehicle is decelerated, the trailer and therefore the tow bar 12 will tend to move forwardly with respect to the trailer hitch 18 and slide block 11. When such forward movement occurs the brakes on the trailer will be actuated, thereby tending to slow the trailer to a rate of speed corresponding with that of the towing vehicle. With proper positioning of the adjusting nut 29, the amount of brake application can be balanced so that the trailer will tend to follow the vehicle at a rate of speed equal to that of the towing vehicle without excessive sideways movement and without excessive brake application.

Other features of this invention which contribute to the utility of the device are embodied in the back up lever 34 and spur 36. The back up lever is made up of a rectangularly shaped block 37 mounted on the tow bar 12 for pivotal movement about a pivot bolt 38. Preferably a spring (not shown) is adapted to hold the block 37 in either the sideways position shown in Fig. 2 or in the alternate forward position as shown by the broken lines in Fig. 2. When the block is in the side position, the slide block 11 is free to move rearwardly whenever the trailer tends to gain on the towing vehicle and when the block 37 is in the alternate position, relative movement between the slide block 11 and tow bar 12 is prevented by contact between the outward edge 39 of the block 37 and the rear edge 33 of the slide block 11.

When it is desired to operate the trailer without the advantage of the automatically actuated hydraulic brakes, the block 37 may be rotated to its forward position to prevent relative motion between the slide and tow bar. This feature becomes especially desirable when the operator of the vehicle wants to back the trailer into a desired position. Without such a deactivating feature the initial backward movement of the towing vehicle would cause the trailer brakes to be locked, thereby preventing movement of the trailer. With such a feature the trailer may be readily backed into position when the block is rotated to its alternate or forward position.

The aforementioned spur 36 is a spring steel member secured to the slide block 11 by means of a cap screw 41 or the like. The spur 36 is of such length and placement that the tip 42 thereof extends below the tow bar 12 for engagement with the ground whenever the trailer becomes detached from the towing vehicle. At the instant of contact the hydraulic brakes on the trailer will be actuated to stop the free trailer almost immediately before the trailer has a chance to run into other vehicles or turn over. Though special precautions are now taken to prevent the detachment of towed trailers from the pulling vehicle, accidents of this nature still occur. When the automatic braking system of this invention, inclusive of the spur 36 is utilized, the possibilites for safe operation are materially increased.

While one specific embodiment of this invention has been shown and described, it will be apparent that this invention is adaptable to modifications and changes. All such modifications and changes as are within the scope of the hereunto appended claims are deemed to be a part of this invention.

What is claimed is:

1. A brake actuating mechanism for trailers having hydraulic braking apparatus separate from the braking system of the towing vehicle, comprising a frame member of said trailer for supporting said actuating mechanism, a hydraulic master-cylinder inclusive of an actuating rod adapted to be mounted on the frame member of the trailer and interconnected with the hydraulic brakes thereof, a slide block for reciprocal movement along said trailer frame positioned adjacent to the brake actuating rod of said master-cylinder, a spring member surrounding the actuating rod for urging said actuating rod into contact with said block, toggle links interconnecting said block to said frame, said links being of such length and placement as to limit the motion of said block toward said master-cylinder and said actuating rod being substantially aligned with the toggle link pivots on said slide block, a trailer hitch connected to said block, a spur member likewise connected to said block for causing relative movement of said block toward said cylinder for actuating the brakes of the trailer whenever the trailer becomes detached from the towing vehicle so that said spur comes into contact with the trailer supporting ground, and back-up means mounted on the frame member and movable into engagement with the slide block to prevent movement of said slide block on the frame at predetermined times, said means including a pivoted member movable from an inoperative position through approximately 90° to an operative position.

2. A brake actuating mechanism for trailers having hydraulic braking apparatus separate from the braking system of the towing vehicle, comprising a frame member of said trailer for supporting said actuating mechanism, a hydraulic master-cylinder inclusive of an actuating rod adapted to be mounted on the frame member of the trailer and interconnected with the hydraulic brakes thereof, a slide block positioned adjacent to the brake actuating rod of said master-cylinder for reciprocal movement along said trailer frame member, toggle links interconnecting said block to said frame, said links being of such length and placement as to limit the motion of said block toward said master-cylinder and said actuating rod being substantially aligned with the toggle link pivots on said slide block, an extension member on said frame member for limiting movement of said block away from said cylinder, a trailer hitch connected to said block, said arrangement being effective to apply the brakes on the trailer whenever forces of deceleration transmitted through the hitch cause relative movement of said block toward said master-cylinder, and back-up means mounted on the frame member and manually movable into engagement with the slide block to prevent movement of said block on the frame at predetermined times, said means including a pivoted member movable from an inoperative position through approximately 90° to an operative position.

JOSEPH A. DE LATEUR.

References Cited in the file of this patent

UNITED STATES PATENTS

| Number | Name | Date |
|---|---|---|
| 1,824,845 | Stout | Sept. 29, 1931 |
| 2,114,279 | Claus | Apr. 19, 1938 |
| 2,133,195 | Howard | Oct. 11, 1938 |
| 2,198,159 | Foley | Apr. 23, 1940 |
| 2,235,340 | Stuart | Mar. 18, 1941 |
| 2,320,585 | Gill et al. | June 1, 1943 |